United States Patent [19]
Carey et al.

[11] Patent Number: 5,866,032
[45] Date of Patent: Feb. 2, 1999

[54] COMPOSITION FOR CONTROLLING SCALE FORMATION IN AQUEOUS SYSTEMS

[75] Inventors: William S. Carey, Wallingford; Libardo A. Perez, Morrisville; Donald T. Freese, Chadds Ford; Judith L. Barron, Doylestown, all of Pa.

[73] Assignee: BetzDearborn Inc., Trevose, Pa.

[21] Appl. No.: 972,530

[22] Filed: Nov. 18, 1997

Related U.S. Application Data

[63] Continuation-in-part of Ser. No. 548,364, Nov. 1, 1995, abandoned.

[51] Int. Cl.$^6$ .................................................. C20F 5/14
[52] U.S. Cl. ......................... 252/180; 252/390; 252/394; 252/395; 252/396; 210/699; 210/700; 210/701
[58] Field of Search .......................... 510/247; 252/180, 252/390, 392, 394, 395, 396; 210/699, 700, 701

[56] References Cited

U.S. PATENT DOCUMENTS

| | | | |
|---|---|---|---|
| 5,063,962 | 11/1991 | Brown et al. | 210/698 |
| 5,147,555 | 9/1992 | Brown et al. | 210/698 |
| 5,183,590 | 2/1993 | Carter et al. | 252/392 |
| 5,248,438 | 9/1993 | Perez | 210/701 |
| 5,256,332 | 10/1993 | Kessler | 252/396 |
| 5,326,478 | 7/1994 | Perez et al. | 210/698 |
| 5,332,505 | 7/1994 | Carey et al. | 210/697 |
| 5,378,372 | 1/1995 | Carey et al. | 210/697 |
| 5,378,390 | 1/1995 | Perez | 252/180 |
| 5,422,010 | 6/1995 | Carey et al. | 210/697 |
| 5,489,666 | 2/1996 | Carey et al. | 252/180 |
| 5,518,629 | 5/1996 | Perez | 210/68 |

*Primary Examiner*—Jacqueline V. Howard
*Assistant Examiner*—Cephia D. Toomer
*Attorney, Agent, or Firm*—Alexander D. Ricci; Steven D. Boyd

[57] ABSTRACT

A composition for of controlling scale formation and deposition and corrosion in aqueous systems is described wherein a treatment solution of a substoichiometric amount of a composition comprising a scale/corrosion inhibitor in combination with a substituted alkylpolycarboxylate is employed. The scale/corrosion inhibitor can be a phosphonate such as hydroxyethylidene diphosphonic acid, 2-phosphonobutane-1,2,4-tricarboxylic acid, hydroxyphosphonoacetic acids, amino phosphonates; terpolymers, copolymers and homopolymers of acrylic acid, maleic acid, epoxysuccinic acids such as polyepoxysuccinic acid or mixtures thereof. The substituted alkylpolycarboxylates are compounds of the general structure: $R-X_m-Y_n$ wherein R is a hydrocarbon functionality having 4 to 18 carbons; X, when present, is $-NH-$, $-NY^1-$, $-N->O$, $-N-OC-Y^1$, $-O-$ or $-S-$; n is greater than or equal to 1; m=0 or 1; and Y and $Y^1$ each independently represent a substituted or nonsubstituted carboxylic acid functionality such that said alkylpolycarboxylate has at least 2 carboxylic acid functional groups.

4 Claims, No Drawings

COMPOSITION FOR CONTROLLING SCALE FORMATION IN AQUEOUS SYSTEMS

This application is a continuation-in-part of application Ser. No. 08/548,364 filed Nov. 1, 1995, now abandoned.

FIELD OF THE INVENTION

The present invention relates to a composition for the treatment of water to inhibit the formation of scale and corrosion. More particularly, the present invention relates to a combination treatment for aqueous systems which comprises a scale and/or corrosion inhibitor in combination with a substituted alkylpolycarboxylate.

BACKGROUND OF THE INVENTION

Although the composition of the present invention has general applicability to any given system where corrosion and/or the formation and deposition of scale is a potential problem, the invention will be discussed in detail as it concerns circulating cooling water systems. The present invention relates to a composition having enhanced scale and corrosion inhibiting properties in aqueous systems. In industrial cooling systems, water such as from rivers, lakes, ponds, etc., is employed as the cooling media for heat exchangers. Such natural waters contain large amounts of suspended material such as silt, clay and organic wastes. The cooling water circulating through a heat exchanger is typically circulated through a cooling tower, spray pond or evaporative systems prior to discharge or reuse. In such systems, cooling is achieved by evaporating a portion of the water passing through the system. Because of the evaporation which takes place during cooling, suspended materials in the water become concentrated. Fouling materials from the feedwater or as a result of the evaporative concentration can settle in locations of low flow rates and cause corrosion and inefficient heat transfer. Agglomerating agents such as polyacrylamides and polyacrylates have been used to agglomerate fine particles of mud and silt into a loose floc for removal. However, these flocs tend to settle in cooling tower basins and frequent cleaning is necessary to remove the settled flocs from the tower basins.

The water employed in industrial cooling water systems also often contains dissolved salts such as calcium, magnesium, etc., which can lead to scale and sludge deposits. One of the most common scale deposits in circulating aqueous cooling systems is calcium carbonate. It normally results from the breakdown of calcium bicarbonate, a naturally occurring soluble salt. Calcium carbonate has a relatively low solubility and its solubility decreases with increasing temperature and pH. Thus, the rate of calcium carbonate deposition increases with increasing pH and temperature.

Deposit control agents such as phosphates, phosphonates, polymaleic acids and polyacrylates are often used to inhibit calcium carbonate scale formation in industrial cooling water systems. The use of polyacrylates or polymaleic acids alone is not effective at high calcium concentrations because undesirable polyacrylate- or polymaleate-calcium adducts are formed reducing efficacy. Although phosphonates are very efficient at controlling calcium carbonate scale formation, they can produce insoluble phosphonate-calcium complexes or calcium phosphate scale upon degradation.

Preventing the corrosion and scaling of industrial heat transfer equipment is essential to the efficient and economical operation of a cooling water system. Excessive corrosion of metallic surfaces can cause the premature failure of process equipment requiring down time for the replacement or repair of the equipment. Additionally, the buildup of corrosion products on heat transfer surfaces impedes water flow and reduces heat transfer efficiency thereby limiting production or requiring down time for cleaning. Reductions in efficiency will also result from scaling deposits which retard heat transfer and hinder water flow.

Scale can also cause rapid localized corrosion and subsequent penetration of metallic surfaces through the formation of differential oxygen concentration cells. The localized corrosion resulting from differential oxygen cells originating from deposits is commonly referred to as "under deposit corrosion".

The treatment of industrial waters to inhibit scale formation with polyepoxysuccinic acid (hereinafter PESA) is disclosed in U.S. Pat. No. 5,062,962 incorporated herein by reference. The general formula for PESA is:

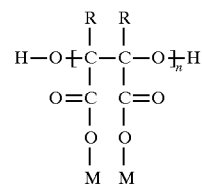

wherein n ranges from about 2 to 50, preferably 2 to 25; M is hydrogen or a water soluble cation such as $Na^+$, $NH_4^+$ or $K^+$ and R is hydrogen, C1–C4 alkyl or C1–C4 substituted alkyl (preferably R is hydrogen). PESA is known to be an effective inhibitor for scale control.

Other materials that are employed to inhibit scale formation and/or corrosion include phosphate type inhibitors such as hydroxyethylidene diphosphonic acid (HEDP), 2-phosphonobutane-1,2,4-tricarboxylic acid (PBTC), hydroxyphosphonoacetic acid, amino phosphonates; terpolymers, copolymers and homopolymers of acrylic acids, maleic acids; and blends thereof.

SUMMARY OF THE INVENTION

The present invention provides an effective composition for enhancing the inhibitory effect of individual or blends of known scale formation, corrosion, and deposition control agents in aqueous systems by combining known scale control materials and one or more substituted alkyl polycarboxylates. The combination of the present invention provides for enhanced scale/corrosion inhibiting and deposit control properties in aqueous systems. The combinations of the present invention provide for scale/corrosion formation inhibition and deposit control in circulating aqueous systems which are effective at conditions of high pH, high scale forming ion concentration and high M-alkalinity where conventional control treatments often lose efficacy. The composition of the present invention controls scale/corrosion formation and the fouling of heat transfer surfaces. The composition of the present invention is effective at treating waters having low levels of scale forming ions as well as those having high scale forming ion levels.

The composition of the present invention is effective at inhibiting the formation and deposition of scale forming materials such as calcium oxalate, calcium sulfate, barium sulfate as well as the more common calcium carbonate. The composition of the present invention is effective at controlling scale deposition on metal surfaces such as Admiralty brass, copper, stainless steel and mild steel, as well as plastics such as polyvinyl chloride (PVC) and poly (methylmethacrylate). The composition of the present invention is effective at inhibiting calcium carbonate at high pH as would be required in paper mills.

The composition of the present invention comprises a combination of one or more scale/corrosion inhibitor such as phosphonates (hydroxyethylidene diphosphonic acid, 2-phosphonobutane-1,2,4-tricarboxylic acid, hydroxyphosphonoacetic acid, amino phosphonates, etc.), terpolymers, copolymers or homopolymers of acrylic acids, maleic acids, or epoxysuccinic acids such as polyepoxysuccinic acid, of the general formula:

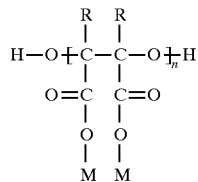

wherein n ranges from about 2 to 50, preferably 2 to 25; M is hydrogen or a water soluble cation such as $Na^+$, $NH_4^+$ or $K^+$ and R is hydrogen, C1–C4 alkyl or C1–C4 substituted alkyl (preferably R is hydrogen), and a substituted alkylpolycarboxylate.

The combination is added to aqueous systems at substoichiometric levels to inhibit scale formation and deposition and/or corrosion.

DESCRIPTION OF THE PREFERRED EMBODIMENTS

The present invention relates to a novel composition of inhibiting the formation and deposition of scale such as calcium scale from circulating aqueous systems. Specifically, the present invention comprises a treatment solution comprising a combination of a scale/corrosion inhibitor such as phosphonates (hydroxyethylidene diphosphonic acid, 2-phosphonobutane-1,2,4-tricarboxylic acid, hydroxyphosphonoacetic acid, amino phosphonates, etc.), terpolymers, copolymers or homopolymers of acrylic acids, maleic acids, or an epoxysuccinic acid such as polyepoxysuccinic acids, of the general formula:

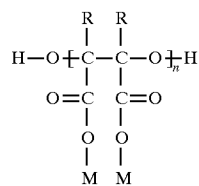

wherein n ranges from about 2 to 50; preferably 2 to 25; M is hydrogen or a water soluble cation such as $Na^+$, $NH_4^+$ or $K^+$ and R is hydrogen, C1–C4 alkyl or C1–C4 substituted alkyl (preferably R is hydrogen), and one or more substituted alkylpolycarboxylates.

Polyepoxysuccinic acids are known to provide scale inhibition comparable to prior art phosphates, phosphonates and polyacrylates without the recognized limitations of the prior art treatments. Polyepoxysuccinic acids are effective in most water systems, and particularly effective in aqueous systems having high Langelier Saturation Index (LSI) numbers. U.S. Pat. No. 5,062,962 (incorporated herein by reference) outlines a method of preparing a polyepoxysuccinic acid material useful in the present invention. It will be appreciated that by-products, for example disodium tartrate, can be co-produced along with the polyepoxysuccinic acid in the course of the referenced reaction scheme. The polyepoxysuccinic acid can be readily recovered from the reaction product by known methods; however, it is feasible and economical to employ the material as produced without separation or purification.

The substituted alkylpolycarboxylates of the combination of the present invention are compounds of the general structure:

$$R-X_m-Y_n$$

wherein R is a hydrocarbon functionality having 4 to 18 carbons; X, represents —NH—, —$NY^1$—, —N—>0, —N—OC—$Y^1$, —O—, or —S—; n is greater than or equal to 1; M=0 or 1; Y and $Y^1$ each independently represent a substituted or non-substituted carboxylic acid functionality such that said compound contains a total of at least 2 carboxylic acid functional groups. Table I sets forth exemplary substituted alkylpolycarboxylates of the present invention.

TABLE I

| Compound | R | X | Y | $Y^1$ |
|---|---|---|---|---|
| AA(N-DDC) | $CH_3-(CH_2)_{11}-$ | —S— | $[CH_2-CH]_n-H$<br>|<br>$CO_2Na$<br>(n > 2) | — |
| $C_n$-IDA | $C_4H_9-$ | —N— | $-(CH_2-CO_2Na)_2$ | — |
|  | $C_8H_{17}-$ | —N— | $-(CH_2-CO_2Na)_2$ | — |
|  | $C_{12}H_{25}-$ | —N— | $-(CH_2-CO_2Na)_2$ | — |
| $C_{12}$-IDA oxide | $C_{12}H_{25}-$ | —N— 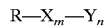 ↓ O | $-(CH_2CO_2H)_2$ | — |

TABLE I-continued

| Compound | R | X | Y | $Y^1$ |
|---|---|---|---|---|
| $C_8$—O-Citric.3Na | $CH_3(CH_2)_7$— | —O— | $CH$—$C(OH)$—$CH_2$ with $CO_2Na$, $CO_2Na$, $CO_2Na$ | — |
| TBCMAPG | tallow | —N(Y$^1$)— | $CH_2CO_2H$ | —$(CH_2)_3$—N—$(CH_2$—$CO_2H)_2$ |
| OBCMAPG | Oleyl | —N(Y$^1$)— | $(CH_2$—$CO_2H)_2$ | $(CH_2)_3$—N—$(CH_2CO_2H)_2$ |
| Doumeen T-HSA | tallow | —N(Y$^1$)— | $(CH_2)_3$—N—CH(CO$_2$Na)—CHOH(CO$_2$Na); $Y^1$ = H (82%); $Y^1$ =CH(CO$_2$Na)—CH(CO$_2$Na)—OH (18%) | |
| Deriphat 160-C | $C_{12}H_{25}$ | —N— | $(CH_2$—$CH_2$—$CO_2H/Na)_2$ | — |
| Deriphat 154-L | tallow | —N— | $(CH_2$—$CH_2$—$CO_2H/Na)_2$ | — |
| TBCEAPA.Na$_3$ | tallow | —N(Y$^1$)— | —$CH_2CH_2CO_2Na$ | $(CH_2)_3N((CH_2)_2CO_2Na)_2$ |
| $C_4$ASP.2Na | $C_4H_9$ | —NH— | —CH(CO$_2$Na)—CH$_2$(CO$_2$Na) | — |
| $C_8$ASP.2Na | $C_8H_{17}$ | —NH— | —CH(CO$_2$Na)—CH$_2$(CO$_2$Na) | — |
| $C_{12}$ASP.2Na | $C_{12}H_{25}$ | —NH— | —CH(CO$_2$Na)—CH$_2$(CO$_2$Na) | — |
| $C_{18}$ASP.2Na | $C_{18}H_{37}$ | —NH— | —CH(CO$_2$Na)—CH$_2$(CO$_2$Na) | — |
| $C_{12}$NHCH$_2$-Succ.2Na | $CH_3(CH_2)_{11}$ | —NH— | $CH_2$—CH(CO$_2$Na)—CH$_2$(CO$_2$Na) | — |
| Monawet SNO35 (Mona Industries) | $C_{18}$(alkyl) | —N(OC—Y$^1$)— | —CH(CO$_2$H)—CH$_2$(CO$_2$H) | SO$_3$Na, —CH$_2$—CH(CO$_2$H) |
| Agaric Acid | $CH_3$—$(CH_2)_{15}$ | — | $CH$—$C(OH)$—$CH_2$ with $CO_2H$, $CO_2H$, $CO_2H$ | — |

In the testing of the scale control properties of inhibitors, the test method measures surface deposition or surface fouling in a dynamic or circulating system. The inventors of the present invention discovered that the efficacy of scale/corrosion inhibitors at controlling surface deposition and bulk phase precipitation in aqueous systems was enhanced by the co-addition of substituted alkylpolycarboxylates.

The treatment levels of scale/corrosion inhibitors added to an aqueous system can range from 25 parts per billion to about 500 parts per million. The preferred treatment levels range from about 1 part per million up to about 100 parts per million. The concentration of scale/corrosion inhibitor necessary to provide effective scale control will vary from system to system. The treatment will vary, in part, with changes in temperature, pH and scale forming ion concentration. However, in all cases, the concentration of scale/corrosion inhibitor added to a circulating aqueous system in accordance with the present invention is at substoichiometric concentrations. That is, the concentration of scale/corrosion inhibitor added is much lower than the concentration of the scale forming material in the system to be treated.

The treatment levels of substituted alkylpolycarboxylate added to the system can range from about 20 parts per billion up to about 50 parts per million. The preferred treatment level ranges from about 0.1 parts per million up to about 10 parts per million. The ratio of scale/corrosion inhibitor to substituted alkylpolycarboxylate can range from about 100 to 1 to about 1 to 10.

The present invention will now be described with reference to a number of specific examples which are to be regarded solely as illustrative and not as restricting the scope of the present invention.

EXAMPLES

Example 1

Dynamic beaker calcium carbonate inhibition testing at varying treatment levels were undertaken. The testing involved adding the treatment to a solution containing calcium and carbonate ions and having a pH of 8.7 at 56° C. Coupons of the materials to be tested were suspended in the solution. The beakers were incubated in a shaking water bath for 66 hours at 56° C. After cooling, a measured portion was filtered, and the pH adjusted to less than 2.0 with hydrochloric acid. The mixture was diluted and the pH adjusted to 12 with sodium hydroxide. A calcium indicator, Murexide, was added and the solution titrated to a pure violet endpoint with ethylenediamine tetraacetic acid. Percent inhibition was calculated from titrations of the treated, stock and control solutions. Deposition on the suspended surfaces was evaluated by visual inspection. The conditions of the tests were: 600 ppm Ca as $CaCO_3$; 300 ppm Mg as $CaCO_3$; 400 ppm Malk as $CaCO_3$; 288 ppm $SO_4$; 425 ppm Cl; 186 ppm Ma; pH 8.7 at 56° C.; 3 ppm tolyltriazole (added to prevent yellow metal corrosion).

Table II summarizes the results of the tests and shows that the combinations of the present invention improve the deposit rating for all of the materials tested.

TABLE II

| ppm-Treatment active | Percent Inhibition | Coupon Material | Deposition* Rating |
|---|---|---|---|
| Control | — | Admiralty | 4.0 |
| Control | — | Plexiglas | 4.0 |
| 10-PESA | 54.0 | Admiralty | 2.0 |
| 20-PESA | 83.0 | Admiralty | 2.0 |
| 10-PESA | 63.3 | Plexiglas | 3.0 |
| 20-PESA | 84.0 | Plexiglas | 4.0 |
| 10-PESA + 2-Monawet sno-35 | 93.0 | Plexiglas | 1.5 |
| 20-PESA + 3-Monawet sno-35 | 95.4 | Plexiglas | 1.0 |
| 20-PESA + 4-Monawet sno-35 | 89.4 | Plexiglas | 1.0 |
| 20-PESA + 10-Monawet sno-35 | 90.9 | Plexiglas | 1.0 |
| 10-PESA + 2-Monawet sno-35 | 87.8 | Admiralty | 1.0 |
| 20-PESA + 2-Monawet sno-35 | 87.0 | Admiralty | 1.0 |
| 20-PESA + 4-Monawet sno-35 | 80.8 | Admiralty | 1.0 |
| 20-PESA + 10-Monawet sno-35 | 87.8 | Admiralty | 1.0 |
| 6-HEDP + 10-HPS I** | 84.4 | Admiralty | 2.0 |
| 6-HEDP + 10-HPS I+ 2-Monawet sno-35 | 84.0 | Admiralty | 1.0 |
| 6-HEDP + 10 HPS I | 93.0 | Plexiglas | 1.5 |
| 6-HEDP + 10 HPS I+ 2-Monawet sno-35 | 91.0 | Plexiglas | 1.0 |
| 10-PESA + 2-AA(N-DDC) | 77.3 | Plexiglas | 3.0 |
| 20-PESA + 2-AA(N-DDC) | 82.4 | Plexiglas | 3.0 |
| 10-PESA + 2-C4-IDA | 73.1 | Plexiglas | 3.0 |
| 20-PESA + 2-C4-IDA | 71.0 | Plexiglas | 3.0 |
| 10-PESA + 2-C4-IDA | 78.4 | Admiralty | 1.0 |
| 20-PESA + 2-C4-IDA | 90.4 | Admiralty | 1.0 |
| 10-PESA + 2-O8-IDA | 74.9 | Plexiglas | 3.0 |
| 20-PESA + 2-C8-IDA | 80.5 | Plexiglas | 2.5 |
| 10-PESA + 2-C8-IDA | 71.9 | Admiralty | 1.0 |
| 20-PESA + 2-C8-IDA | 89.1 | Admiralty | 1.0 |
| 10-PESA + 2-C12-IDA | 82.5 | Plexiglas | 3.0 |
| 20-PESA + 2-C12-IDA | 83.9 | Plexiglas | 2.0 |
| 10-PESA + 2-C12-IDA | 77.4 | Admiralty | 1.0 |
| 20-PESA + 2-C12-IDA | 90.4 | Admiralty | 1.0 |
| 10-PESA + 2-C8-O-CITRIC.3NA | 90.4 | Plexiglas | 2.0 |
| 10-PESA + 4-C8-O-CITRIC.3NA | 96.8 | Plexiglas | 1.0 |
| 20-PESA + 2-C8-O-CITRIC.3NA | 92.2 | Plexiglas | 1.0–3.0 |
| 20-PESA + 4-C8-O-CITRIC.3NA | 92.3 | Plexiglas | 1.0 |
| 10-PESA + 2-C8-O-CITRIC.3NA | 66.1 | Admiralty | 1.0–2.0 |
| 20-PESA + 2-C8-O-CITRIC.3NA | 90.6 | Admiralty | 1.0 |
| 10-PESA + 2-TBCMAPG | 100.0 | Plexiglas | 1.0 |
| 20-PESA + 2-TBCMAPG | 99.5 | Plexiglas | 1.0 |
| 10-PESA + 2-TBCMAPG | 70.7 | Admiralty | 1.0 |
| 20-PESA + 2-TBCMAPG | 86.3 | Admiralty | 1.0 |
| 10-PESA + 2-OBCMAPG | 100.0 | Plexiglas | 1.0 |
| 20-PESA + 2-OBCMAPG | 98.5 | Plexiglas | 1.0 |
| 10-PESA + 2-OBCMAPG | 55.6 | Admiralty | 3.0 |
| 20-PESA + 2-OBCMAPG | 65.2 | Admiralty | 3.0 |
| 10-PESA + 2-Duomeen T-HSA | 89.0 | Plexiglas | 1.0 |
| 20-PESA + 2-Duomeen T-HSA | 92.6 | Plexiglas | 1.0 |
| 10-PESA + 2-Duomeen T-HSA | 71.9 | Admiralty | 2.0 |
| 20-PESA + 2-Duomeen T-HSA | 77.9 | Admiralty | 1.0 |
| 10-PESA + 2-Deriphat 160-C | 74.9 | Plexiglas | 3.0 |
| 20-PESA + 2-Deriphat 160-C | 78.0 | Plexiglas | 2.0 |
| 10-PESA + 2-Deriphat 160-C | 57.9 | Admiralty | 1.0 |
| 20-PESA + 2-Deriphat 160-C | 76.4 | Admiralty | 2.0 |
| 10-PESA + 2-Deriphat 154-L | 93.0 | Plexiglas | 1.0 |
| 20-PESA + 2-Deriphat 154-L | 87.0 | Plexiglas | 1.0 |
| 10-PESA + 2-Deriphat 154-L | 79.8 | Admiralty | 1.0 |
| 20-PESA + 2-Deriphat 154-L | 72.0 | Admiralty | 1.0 |
| 10-PESA + 2-TBCEAPA.NA3 | 93.7 | Plexiglas | 1.0 |
| 20-PESA + 2-TBCEAPA.NA3 | 87.3 | Plexiglas | 1.0 |
| 10-PESA + 2-TBCEAPA.NA3 | 88.7 | Admiralty | 2.0 |
| 20-PESA + 2-TBCEAPA.NA3 | 87.0 | Admiralty | 2.0 |
| 20-PESA + 2-C4-Asp.2Na | 76.6 | Plexiglas | 4.0 |
| 20-PESA + 2-C4-Asp.2Na | 74.3 | Admiralty | 2.0 |
| 20-PESA + 2-C8-Asp.2Na | 73.0 | Plexiglas | 4.0 |
| 20-PESA + 2-C8-Asp.2Na | 82.7 | Admiralty | 2.0 |
| 20-PESA + 2-C12-Asp.2Na | 78.6 | Plexiglas | 3.0–4.0 |
| 20-PESA + 2-C12-Asp.2Na | 84.0 | Admiralty | 1.0 |
| 20-PESA + 2-C18-Asp.2Na | 84.1 | Plexiglas | 3.0 |
| 20-PESA + 2-C18-Asp.2Na | 4.5 | Admiralty | 1.0 |
| 10-PESA + 2-C12-NH—CH2-SUCC.2NA | 81.6 | Plexiglas | 3.0 |
| 20-PESA + 2-C12-NH—CH2-SUCC.2NA | 80.6 | Plexiglas | 2.0–3.0 |
| 10-PESA + 2-C12-NH—CH2-SUCC.2NA | 58.5 | Admiralty | 3.0 |
| 20-PESA + 2-C12-NH—CH2-SUCC.2NA | 77.8 | Admiralty | 2.0 |
| 10-PESA + 2-Agaric Acid | 66.5 | Plexiglas | 2.0 |
| 20-PESA + 2-Agaric Acid | 80.0 | Plexiglas | 1.0 |
| 10-PESA + 2-Agaric Acid | 65.0 | Admiralty | 2.0 |
| 20-PESA + 2-Agaric Acid | 80.0 | Admiralty | 1.0 |
| 10-PESA + 2-C12 IDA oxide | 82.6 | Plexiglas | 4.0 |
| 20-PESA + 2-C12 IDA oxide | 87.1 | Plexiglas | 3.0 |
| 2-Monawet sno-35 | 6.9 | Admiralty | 4.0 |
| 5-Monawet sno-35 | -7.5 | Admiralty | 4.0 |
| 10-Monawet sno-35 | -5.0 | Admiralty | 4.0 |
| 20-Monawet sno-35 | -0.9 | Admiralty | 4.0 |
| 20-C8-O-CITRIC.3NA | -4.7 | Plexiglas | 3.0 |
| 20-C8-O-CITRIC.3NA | 8.2 | Admiralty | 4.0 |
| 10-C8-IDA | -10.3 | Admiralty | 4.0 |
| 10-C8-IDA | -9.6 | Admiralty | 4.0 |
| 10-C12-IDA | -16.9 | Admiralty | 4.0 |
| 10-C12-IDA | -17.1 | Admiralty | 3.0–4.0 |
| 20-TBCEAPA.NA3 | 8.6 | Plexiglas | 2.0 |
| 20-TBCEAPA.NA3 | 7.5 | Admiralty | 4.0 |
| 2-Agaric Acid | 3.0 | Admiralty | 3.0 |

*1 = Clean; 2 = Very Slight Deposit; 3 = Slight Deposit; 4 = Moderate Deposit
**HPS I is a copolymer of acrylic acid and allylhydroxypropylsulfonate ether sodium salt available from Betz Laboratories, Inc.

The pH and temperature of the circulating water are automatically controlled. The treated water was prepared by the addition of the component ions to deionized water. Provisions for continuous makeup and blowdown are

Example 2

Testing was conducted in a bench top unit (BTU) which simulates a circulating cooling water system. The BTU units are designed to provide a measure of the ability of the treatment to prevent corrosion and scale formation under heat transfer conditions. The treated water is circulated through a corrosion coupon by-pass rack, into which corrosion coupons are inserted and passes through a heat exchanger tube contained in a Plexiglas® block (trademark of Rohm & Haas Company). The heat exchanger is fitted with an electrical heater so that the heat load on the exchanger tube can be varied and controlled in the 0 to 16,000 BTU/ft$^2$/hr range. The water velocity passing the unit can be controlled in the 0 to 4.5 ft/sec. range. A section of PVC tower fill is immersed in the sump of the unit. The pH and temperature of the circulating water are automatically controlled. The treated water was prepared by the addition of the component ions to deionized water. Provisions for continuous makeup and blowdown are made by pumping fresh treated water from supply tanks to the sump of the unit, with overflow from the sump serving as blowdown. The system volume is approximately 12 liters.

Table III summarizes testing in these bench top units for a variety of materials. The test conditions were: 600 ppm Ca as CaCO$_3$; 300 ppm Mg as CaCO$_3$; 400 ppm Malk as CaCO$_3$; 288 ppm SO$_4$; 425 ppm Cl; 187 ppm Na; 3 ppm tolyltriazole; pH 8.8; bulk temperature 49° C.; skin temperature 57° C.; flow rate 2.8 feet/second; heat input 13,000 BTU/ft$^2$/hr. The heat transfer surfaces and coupons were admiralty brass.

TABLE III

| Treatment | ppm Active | Tube* Depos. Rating | Plexiglas Block Dep. Rating | PVC Tower* Fill Dep. Rating | COUP.* Dep. Rating | Duration Days | Turbidity (NTU) |
|---|---|---|---|---|---|---|---|
| PESA | 20 | 4.0 | 4.0 | 4.0 | 4.0 | 7 | 5.86 |
| PESA | 20 | 1.5N | 1.0 | 1.0 | 1.5 | 7 | 0.81 |
| Monawet sno-35 | 2 | | | | | | |
| PESA | 20 | 1.0 | 1.0 | 1.0 | 1.0 | 7 | 0.50 |
| Agaric Acid | 1 | | | | | | |
| HEDP | 6 | 2.5U | N/A | 2.0U | 2.0U | 7 | — |
| HPS II** | 10 | | | | | | |
| HEDP | 6 | 1.0 | N/A | 1.0 | 1.0 | 7 | 1.74 |
| HPS II** | 10 | | | | | | |
| Monawet sno-35 | 2 | | | | | | |
| Acumer 4200 (Rohm & Haas) | 20 | 3.0N | N/A | 1.0 | 1.0 | 7 | 1.14 |
| Acumer 4200 | 20 | 1.5N | N/A | 1.0 | 1.0 | 7 | 1.14 |
| Monawet sno-35 | 2 | | | | | | |

*1 = Clean; 2 = Very Slight Deposit; 3 = Slight Deposit; 4 = Moderate Deposit
*N = Non-uniform Deposit
U = Uniform Deposit
N/A = A PVC Deposition Block was used instead of Plexiglas
**HPS II is a copolymer of acrylic acid and allylhydroxypropylsulfonate ether sodium salt available from Betz Laboratories, Inc.

Table IV summarizes testing in these bench top units and shows the corrosion and deposit control activity of the present invention. The test conditions were: 600 ppm Ca as CaCO$_3$; 300 ppm Mg as CaCO$_3$; 400 ppm Malk as CaCO$_3$; 288 ppm SO$_4$; 425 ppm Cl; 187 ppm Na; 3 ppm tolyltriazole; pH 8.8; bulk temperature 49° C.; skin temperature 57° C.; fbw rate 2.8 feet/second; heat input 13,000 BTU/ft$^2$/hr. The heat transfer surfaces and coupons were low carbon steel.

TABLE IV

| Treatment | ppm Active | Tube* Depos. Rating | Plexiglas Block Dep. Rating | PVC Tower* Fill Dep. Rating | COUP.* Dep. Rating | Duration Days | Turbidity (NTU) |
|---|---|---|---|---|---|---|---|
| PESA | 20 | 2.0U | 5.0 | 3 | 3 (2.4 mpy) | 7 | 1.2 |
| PESA Agaric Acid | 20 1 | 1.5U | 1 | 1 | 1.5U (1.2 mpy) | 7 | 1.3 |
| PESA Monawet sno-35 | 20 2 | 1.5N | 1.5 | 1 | 2.0U (1.3 mpy) | 7 | 0.5 |

*1 = Clean; 2 = Very Slight Deposit; 3 = Slight Deposit; 4 = Moderate Deposit
N = Non-uniform Deposit
U = Uniform Deposit
N/A = A PVC Deposition Block was used instead of Plexiglas Table V summarizes the results of the bench top unit testing and shows that the combinations of the present invention enhance the corrosion and deposit control activity in circulating systems. The test conditions were: 600 ppm Ca as CaCO$_3$; 300 ppm Mg as CaCO$_3$; 500 ppm Malk as CaCO$_3$; 288 ppm SO$_4$; 425 ppm Cl$^-$; 231 ppm Na; 3 ppm tolyltriazole; pH 9.0; bulk temperature 49° C.; skin temperature 57° C.; flow rate 2.8 feet/second; heat input 13,000 BTU/ft$^2$/hr. The heat transfer surfaces and coupons were admiralty brass.

TABLE V

| Treatment | ppm Active | Tube* Depos. Rating | PVC Tower* Fill Dep. Rating | COUP.* Dep. Rating | Duration Days | Turbidity (NTU) |
|---|---|---|---|---|---|---|
| PESA PBTC HPS II | 6.0 6.0 20.0 | 5 N | 4 N | 4 N | 8 | 59.9 |
| PESA PBTC HPS II Monawet sno-35 | 6.0 6.0 15.0 2.0 | 1 | 1 | 1 | 16 | 2.7 |

*1 = Clean; 4 = Moderate Deposit; 5 = Heavy Deposit
N = Non-uniform Deposit

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true scope and spirit of the present invention.

We claim:

1. A composition for controlling corrosion and the formation and deposition of calcium scale forming salts in an aqueous system comprising a treatment solution comprising (a) a scale/corrosion inhibitor and (b) a substituted alkylpolycarboxylate, other than modified epoxysuccinic acid and modified polyepoxysuccinic acid, of the general structure R—X$_m$—Y$_n$ wherein R is a hydrocarbon functionality having 4 to 18 carbons; X, is —NH—, —NY$^1$—, —N—>O, —N—OC—Y$^1$, —O— or —S; n is greater than or equal to 1; and Y and Y$^1$ each independently represent a substituted or non-substituted carboxylic acid functionality such that said alkylpolycarboxylate has at least 2 carboxylic acid functional groups wherein the ratio of (a):(b) is from about 100:1 to about 1:10.

2. The composition of claim 1 wherein said scale/corrosion inhibitor is selected from the group consisting of phosphonates, terpolymers, copolymers and homopolymers of acrylic acid, maleic acid and epoxysuccinic acid based polymers or mixtures thereof.

3. The composition of claim 2 wherein said phosphonate is selected from the group consisting of hydroxyethylidenediphosphonic acid, 2-phosphonobutane-1,2,4-tricarboxylic acid, hydroxyphosphonoacetic acids, and aminophosphonates.

4. The composition of claim 1 wherein said scale/corrosion inhibitor is present in an aqueous system at active treatment levels ranging from about 25 parts per billion to about 100 parts per million and said substituted alkylpolycarboxylate is present in an aqueous system at active treatment levels ranging from about 20 parts per billion up to about 50 parts per million.

* * * * *